3,041,343
4-(THIENYL-2″)- AND 4-(PYRIDYL-3″)-5-
AMINOPYRAZOLES
Ernst Jucker, Binningen, Basel-Land, and Adolf J. Lindenmann, Basel, Switzerland, assignors to Sandoz Ltd., Basel, Switzerland
No Drawing. Filed Sept. 20, 1960, Ser. No. 57,120
Claims priority, application Switzerland Oct. 14, 1959
9 Claims. (Cl. 260—293)

The present invention relates to a novel and useful—more especially therapeutically useful—group of 5-aminopyrazoles of the formula

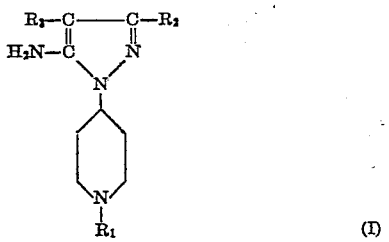

wherein $R_1$ and $R_2$ each stands for an alkyl group—straight-chained or branch-chained—with 1 to 4 carbon atoms (e.g. methyl, propyl, isopropyl, isobutyl, etc.) and $R_3$ stands for the 2-thienyl radical

or for the 3-pyridyl radical

and to the tautomers of the said pyrazole derivatives I.

The new compounds are advantageously prepared by condensing an acylacetic acid nitrile of the formula

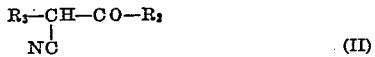

wherein $R_2$ and $R_3$ have the precedingly-recited significances, with a hydrazine of the formula

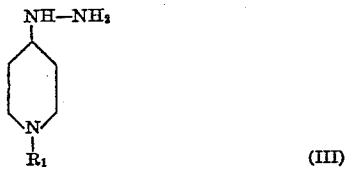

wherein $R_1$ has the precedingly-recited significance.

The preparation of the new 5-aminopyrazoles I, substituted in the 1-position by an N-alkyl-4-piperidyl radical and in the 4-position by the 2-thienyl or the 3-pyridyl radical, may for example conveniently be carried out as follows: A suspension of an acylacetic acid nitrile of Formula II—e.g. α-propionyl-thienyl-(2)-acetonitrile—in an anhydrous organic solvent, such for example as glacial acetic acid, has stirred thereinto at room temperature (about 20° to about 30° C.), a solution of a hydrazine derivative of formula III—e.g. N-methyl-piperidyl-4-hydrazine—in the same solvent. To assure completion of the ensuing reaction, stirring is then continued for two more hours at room temperature. After removal of the solvent in vacuo from the obtained reaction mixture, the desired reaction product is isolated, e.g. by distillation in a high vacuum, and if desired may then be purified by crystallization.

The new compounds I of the present invention are crystalline or liquid at room temperature and can be distilled in a high vacuum without undergoing decomposition. They are basic compounds which form stable therapeutically useful water-soluble salts, crystalline at room temperature, with a wide variety of inorganic and organic acids. Thus, for example, with hydrochloric, tartaric, acetic, phosphoric, maleic, citric, benzenesulfonic acids, etc., they form the corresponding hydrochlorides, tartrates, acetates, phosphates, maleates, citrates, benzenesulfonates, etc.

The new pyrazoles I as well as their salts with acids possess outstanding pharmacodynamic properties which render them excellently suitable for use in therapy. Thus, while being of low toxicity, they exert antiphlogistic, analgetic, antipyretic and adrenolytic actions and possess, more especially, a specific antirheumatic activity. In addition, they comprise compounds with a serotonin-inhibiting action.

For example, testing, the antiphlogistic (inflammation inhibiting) action on formalin oedema in the rat paw upon subcutaneous administration of:

(a) 1-(N-methyl-piperidyl-4′)-3-methyl-4-(thienyl - 2″)-5-aminopyrazole;
(b) 1-(N-methyl-piperidyl-4′)-3-ethyl-4-(thienyl-2″) - 5-aminopyrazole; and
(c) 1-(N-isopropyl-piperidyl-4′)-3-ethyl-4-(thienyl - 2″)-5-aminopyrazole, gives the following average inhibition of the formalin oedema:

TABLE I

| Substance | Average Inhibition of Formalin Oedema in percent after Administration of— | | | |
|---|---|---|---|---|
| | 5 mg./kg. | 10 mg./kg. | 20 mg./kg. | 50 mg./kg |
| (a) | −9.7 | −11.4 | −14.4 | −11.8 |
| (b) | −2.1 | −12.7 | −11.2 | −28.7 |
| (c) | −5.2 | −11.4 | −13.8 | −19.9 |

The following table (Table II) shows the inhibition of serotonin oedema in the rat paw after subcutaneous administration of the compounds a, b and c:

TABLE II

| Substance | Average Inhibition of Serotonin Oedema in percent after Subcutaneous Administration of— | | | | | | |
|---|---|---|---|---|---|---|---|
| | 0.5 mg./kg. | 1 mg./kg. | 2 mg./kg. | 10 mg./kg. | 20 mg./kg. | 50 mg./kg. | 100 mg./kg. |
| (a) | | | | −7.1 | −15.0 | | −17.9 |
| (b) | −5.8 | −8.6 | −18.1 | | −16.7 | −18.1 | −24.6 |
| (c) | −1.6 | −6.6 | −18.0 | −19.4 | | | −11.4 |

The negative percentages in Tables I and II indicate the lesser magnitudes in which the oedema appears in the pre-treated subjects than in untreated control subjects.

The antipyretic action in feverish rats is exemplified by the fact that 1-(N-methyl-piperidyl-4′)-3-n-butyl-4-(thienyl-2″)-5-aminopyrazole, intravenously administered in a dose of about 10 mg./kg., brings about a temperature drop of at least 0.7° C.

Since, as aforestated, the new pyrazoles I are readily convertible into water-soluble salts thereof with inorganic and organic acids, the present invention renders available for therapeutic purposes pyrazole derivatives which are distinguished by particularly good resorbability, so that they may be administered per os, e.g. in tablet form. There is also made readily possible the preparation of highly concentrated solutions which in many cases are indispensable for parenteral "stoss" therapy. In addition, the new compounds are useful as intermediates for the preparation of other therapeutically useful products.

The acylacetic acid nitriles of formula II may be prepared by known methods, for example by reacting thienyl-(2-acetonitrile or pyridyl-(3)-acetonitrile with the appropriate acetic acid-, propionic acid- or valerianic acid-esters.

The compounds of Formula III, wherein $R_1$ is a lower alkyl group, can be prepared by condensing an N-alkyl-4-piperidone with a monoacyl-hydrazine, catalytically reducing the resulting acyl-hydrazone to the acylated hydrazine derivative, and then splitting off the acyl group by heating with aqueous mineral acid.

In the following examples which, by way of illustration only, set forth presently preferred embodiments of the invention, the parts are by weight unless otherwise indicated. Parts by weight bear the same relationship to parts by volume as do grams to milliliters. Temperatures are in degrees centigrade; melting points and boiling points are uncorrected.

*Example 1*

A solution of 16.0 parts of α-acetyl-thienyl-(2)-acetonitrile and 12.5 parts of N-methyl-piperidyl-4-hydrazine in 225 parts by volume of absolute ethanol is allowed to stand for one hour at room temperature and is then heated to boiling under reflux for 3 hours. The ethanol is then evaporated off under reduced pressure and the dark-brown, thickly viscous residue is distilled in a high vacuum (0.1 mm. Hg), whereupon the desired 1-(N - methyl-piperidyl - 4')-3-methyl - 4-(thienyl-2")-5-aminopyrazole goes over at between 179° and 210° under the said pressure of 0.1 mm. Hg and solidifies in the condenser. After recrystallization from benzene, the new compound melts at 97–99°.

*Example 2*

A solution of 10.8 parts of N-methyl-piperidyl-4-hydrazine in 37 parts by volume of glacial acetic acid is stirred dropwise into a suspension of 15.0 parts of α-propionyl-thienyl-(2)-acetonitrile in 37 parts by volume of glacial acetic acid, care being taken that the temperature does not exceed 30°. The dark gray-brown reaction mixture is then further stirred for two more hours at room temperature, after which the glacial acetic acid is distilled off at 40° under reduced pressure. The residue is taken up in 250 parts by volume of water, and the resultant aqueous solution is adjusted to alkalinity by and saturated with sodium carbonate, whereupon a dark-brown resinous mass separates out. This is extracted with a total of 700 parts by volume of chloroform, the combined chlorofrom extracts dried over magnesium sulfate, and the chloroform removed under reduced pressure. The so-obtained crystalline residue—1-(N-methyl-piperidyl-4')-3-ethyl-4 - (thienyl-2")-5 - aminopyrazole—is recrystallized from benzene, whereupon it melts at 129–130°.

The α-propionyl-thienyl-(2)-acetonitrile is prepared by reacting thienyl-(2)-acetonitrile in ethanolic solution with ethyl propionate in the presence of sodium ethylate. M.P. 89–91° after crystallization from ether-petroleum ether.

*Example 3*

A solution of 4.75 parts of N-isopropyl-piperidyl-4-hydrazine in 13 parts by volume of glacial acetic acid is stirred dropwise into a suspension of 5.4 parts of α-propionyl-thienyl-(2)-acetonitrile in 13 parts by volume of glacial acetic acid, care being taken that the temperature does not exced 50°. The dark gray-brown reaction mixture is then further stirred for two more hours at room temperature, after which the glacial acetic acid is distilled off at about 40° under reduced pressure. The residue is distilled in a high vacuum (0.01 mm. Hg), the desired 1-(N - isopropyl-piperidyl-4')-3-ethyl - 4-(thienyl-2")-5-aminopyrazole passing over as a thickly viscous brownish yellow oil at betwen 175° and 205° under the said pressure of 0.01 mm. Hg. The distillate is then dissolved in a small quantity of methanol and the calculated amount of a methanolic maleic acid solution added. The solution is then concentrated under reduced pressure, after which ether is slowly added, whereupon the 1-(N-isopropyl-piperidyl-4')-3-ethyl-4-(thienyl-2")-5-aminopyrazole-bis-maleate separates out in crystalline form. After two recrystallizations from methanol-ether, the said bis-maleate melts at 131–132°.

*Example 4*

A solution of 3.2 parts of N-methyl-piperidyl-4-hydrazine in 12 parts by volume of glacial acetic acid is stirred dropwise in the course of 20 minutes into a suspension of 5.1 parts of α-valeroyl-thienyl-(2)-acetonitrile in 12 parts by volume of glacial acetic acid, care being taken that the temperature does not exced 50°. The dark brown reaction solution is then further stirred for two more hours at room temperature, after which the glacial acetic acid is distilled off at 40–50° under reduced pressure. The residue is taken up in 120 parts by volume of water, and while cooling the same with ice, the aqueous solution is adjusted to alkalinity by and saturated with potassium carbonate, whereupon a dark-brown resinous mass separates out. It is extracted with a total of 150 parts by volume of chloroform, the combined chloroform extracts dried over magnesium sulfate, and the chloroform removed under reduced pressure. The so-obtained residue is distilled under a pressure of 0.01 mm. Hg, whereupon the desired 1-(N-methyl-piperidyl-4')-3-n-butyl-4-(thienyl-2")-5-aminopyrazole distills over at an air-bath temperature of 180–210°.

To prepare the bis-maleate, the yellow-brown thickly viscous distillate is taken up in 10 parts by volume of absolute ethanol, after which a solution of 4.3 parts of maleic acid in 10 parts by volume of absolute ethanol is added. The solvent is then removed under reduced pressure and the crystalline residue—1-(N-methyl-piperidyl-4')-3-n-butyl - 4-(thienyl - 2")-5-aminopyrazole - bis-maleate—is twice recrystallized from methanol-ether. The so-obtained colorless crystals melt at 128–130°.

The α-valeroyl-thienyl-(2)-acetonitrile is obtained by reacting thienyl-(2)-acetonitrile in ethanolic solution with ethyl valerianate in the presence of sodiumethylate. M.P. 70–72° after crystallization from ether-petroleum ether.

*Example 5*

6.9 parts of the sodium salt of α-(pyridyl-3)acetoacetic acid nitrile in 70 parts by volume of glacial acetic acid are heated to 40° for 15 minutes. After cooling to 20°, a solution of 4.9 parts of N-methyl-piperidyl-4-hydrazine in 8 parts by volume of glacial acetic acid is stirred in dropwise, care being taken that the temperature does not exceed 40°. The reaction mixture is then further stirred for five hours at room temperature, allowed to stand overnight, and the glacial acetic acid distilled off at 40–50° under reduced pressure. The residue is taken up in 100 parts by volume of water, washed with a total of 120 parts by volume of ether, the aqueous solution adjusted to alkalinity by and saturated with sodium carbonate and extracted with a total of 180 parts by volume of chloroform. After drying the chloroform extract over magnesium sulfate, the chloroform is evaporated off under reduced pressure, and the crystalline residue—1-(N-methyl-piperidyl-4')-3-methyl-4 - (pyridyl-3")-5-aminopyrazole—recrystallized from ethyl acetate and chloroform-petroleum ether. M.P. 188–190°.

The sodium salt of α(-pyridyl-3)-acetoacetic acid nitrile is prepared by reacting pyridyl-(3)-acetonitrile in ethanolic solution with ethyl acetate in the presence of sodium ethylate. M.P. about 275° (decomposition). Treatment of the sodium salt with glacial acetic acid yields α(pyridyl-3)-acetoacetic acid nitrile. M.P. 194–196°.

In like manner, other 4-(pyridyl-3″)-5-aminopyrazole derivatives such as e.g. 1-(N-isopropyl-piperidyl-4′)-3-methyl - 4-(pyridyl - 3″)-5-aminopyrazole, 1-(N-methyl-piperidyl-4′)-3-ethyl-4 - (pyridyl-3″)-5-aminopyrazole or 1-(N - methyl-piperidyl-4′)-3-n-butyl - 4-(pyridyl-3″)-5-aminopyrazole can mutatis mutandis be prepared in manner analogous to the above-described preparation of 1-(N-methylpiperidyl-4′)-3-methyl-4-(pyridyl-3″)-5-aminopyrazole, by employing the corresponding starting compounds II and III.

Having thus disclosed the invention, what is claimed is:

1. A compound of the formula

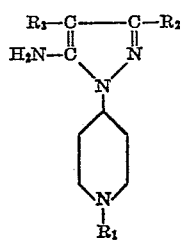

wherein each of $R_1$ and $R_2$ is an alkyl group with 1 to 4 carbon atoms, and $R_3$ is 2-thienyl.

2. A compound of the formula

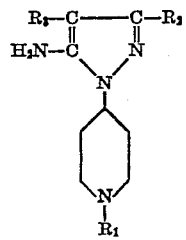

wherein each of $R_1$ and $R_2$ is an alkyl group with 1 to 4 carbon atoms, and $R_3$ is 3-pyridyl.

3. A therapeutically acceptable acid addition salt of a compound of the formula

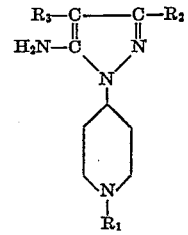

wherein each of $R_1$ and $R_2$ is an alkyl group with 1 to 4 carbon atoms, and $R_3$ is 2-thienyl.

4. A therapeutically acceptable acid addition salt of a compound of the formula

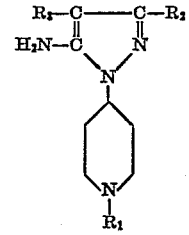

wherein each of $R_1$ and $R_2$ is an alkyl group with 1 to 4 carbon atoms, and $R_3$ is 3-pyridyl.

5. 1 - (N - methyl - piperidyl - 4′) - 3 - methyl - 4-(thienyl-2″)-5-aminopyrazole.

6. 1 - (N - methyl - piperidyl - 4′) - 3 - ethyl - 4-(thienyl-2″)-5-aminopyrazole.

7. 1 - (N - isopropyl - piperidyl - 4′) - 3 - ethyl - 4-(thienyl-2″)-5-aminopyrazole.

8. 1 - (N - methyl - piperidyl - 4′) - 3 - n - butyl - 4-(thienyl-2″)-5-aminopyrazole.

9. 1 - (N - methyl - piperidyl - 4′) - 3 - methyl - 4-(pyridyl-3″)-5-aminopyrazole.

References Cited in the file of this patent

Richter's Organic Chemistry (Textbook), 3rd edition, vol. 4, pages 22–25, 195 and 196 (1947). Elsevier Publishing Co., Inc., New York, N.Y.